United States Patent [19]

Huss

[11] Patent Number: 4,879,484
[45] Date of Patent: Nov. 7, 1989

[54] ALTERNATING CURRENT GENERATOR AND METHOD OF ANGULARLY ADJUSTING THE RELATIVE POSITIONS OF ROTORS THEREOF

[75] Inventor: John B. Huss, Rockford, Ill.

[73] Assignee: Sundstrand Corporation, Rockford, Ill.

[21] Appl. No.: 208,114

[22] Filed: Jun. 17, 1988

[51] Int. Cl.$^4$ .................................... H02K 16/00
[52] U.S. Cl. .................................. 310/114; 310/156; 322/28
[58] Field of Search ............... 310/112, 114, 126, 156, 310/261, 191; 322/28, 29, 51, 52

[56] References Cited

U.S. PATENT DOCUMENTS

| | | | |
|---|---|---|---|
| 2,446,393 | 8/1948 | Russell | 318/675 |
| 2,824,275 | 2/1958 | Kober | 322/27 |
| 2,978,621 | 4/1961 | Martinek | 318/674 |
| 3,192,422 | 6/1965 | Kober | 310/191 |
| 3,233,133 | 2/1966 | Kober | 310/191 |
| 3,713,015 | 1/1973 | Frister | 322/28 |
| 4,607,180 | 8/1986 | Stoody | 310/80 |
| 4,654,577 | 3/1987 | Howard | 322/28 |
| 4,663,581 | 5/1987 | Glennon | 322/52 |
| 4,691,119 | 9/1987 | McCabria | 307/84 |

Primary Examiner—Peter S. Wong
Assistant Examiner—Judson H. Jones
Attorney, Agent, or Firm—Antonelli, Terry & Wands

[57] ABSTRACT

An improved actuator for angularly adjusting first and second rotors of an alternating current generator reduces friction and minimizes the power necessary for affecting the angular adjustment. The rotors are driven by a common shaft through left and right hand helical ball splines. Axial movement of the shaft relative to the rotors is effected for simultaneously rotating each of the rotors a like amount in opposite directions during a relative angular adjustment.

10 Claims, 4 Drawing Sheets

ALTERNATING CURRENT GENERATOR AND METHOD OF ANGULARLY ADJUSTING THE RELATIVE POSITIONS OF ROTORS THEREOF

TECHNICAL FIELD

The present invention is directed to an actuator for angularly adjusting first and second rotors which are rotatable about a common axis, relative to each other about the common axis. More particularly, the invention is directed to an alternating current generator having an improved means for angularly adjusting the rotors thereof relative to one another and a method of accomplishing the same.

BACKGROUND ART

The use of permanent magnet rotors in generators has created a problem with voltage control as the generator load varies. The output voltage of a dual permanent magnet generator is controlled by shifting the two rotors in and out of phase. For example, at a two per unit load, the magnetic poles would be lined up, while at no load, the poles would be 78° out of phase.

An alternating current generator having a twin permanent magnet rotor which is adjustable in response to output voltage is known from U.S. Pat. No. 3,713,015. As disclosed therein, only one rotor is actuated using a lever to force sliding motion for achieving a relative rotation of the rotors. This known arrangement involves considerable friction and therefor requires significant power for overcoming inertia to angularly adjust the rotors.

DISCLOSURE OF INVENTION

An object of the present invention is to overcome the aforementioned problem with known actuators for angularly adjusting the permanent magnet rotors of a generator. More particularly, an object of the present invention is to provide an improved actuator for angularly adjusting permanent magnet rotors, an alternating current generator incorporating the same and a method of angularly adjusting the relative positions of the rotors, which require much less power to overcome inertia for affecting an adjustment as compared with the known arrangements which actuate only one rotor during an adjustment.

These and other objects of the invention are attained by providing an alternating current generator according to the invention, which comprises stator means having an output winding for producing an output voltage, rotor means within the stator means, the rotor means including first and second magnet rotors rotatable about a common axis, and means for angularly adjusting the first and second rotors relative to one another about the common axis. The means for angularly adjusting the rotors including means for rotating each of the first and second rotors in opposite directions relative to the other for affecting a relative angular adjustment of the rotors. Rotating each rotor simultaneously in opposite directions half the required angle requires much less power to overcome inertia than rotating only one rotor the full angle.

According to the disclosed, preferred embodiment of the invention, the means for rotating simultaneously rotates each of the rotors a like amount in opposite directions during a relative angular adjustment. This is accomplished using a common drive shaft extending along the common axis of the rotors for rotatably driving both the first and second rotors about the common axis. Left and right hand helical ball splines are located between the drive shaft and the first and second rotors, respectively. Rotation of the first and second rotors in opposite directions relative to one another is accomplished by affecting axial movement of the drive shaft along the common axis relative to the rotors. In the illustrated embodiment, means are provided for rotatably supporting the rotors at essentially fixed locations along the common axis and means is provided for axially moving the drive shaft along the common axis relative to the rotors for affecting an angular adjustment of the rotors. In one form of the invention the means for axially moving the drive shaft comprises a hydraulic drive means. According to a second form of the invention, the means for axially moving the drive shaft comprises an electric motor. In either case, the use of the oppositely directed helical ball splines together with the axial movement of the single drive shaft, reduces the friction required for angular adjustment of the rotors and thereby reduces the power necessary for accomplishing the adjustment.

The method of angularly adjusting the relative positions of the first and second rotors of a permanent magnet generator about a common axis of rotation of the rotors according to the invention, comprises rotating each of the rotors in opposite directions relative to the other to affect a relative angular adjustment of the rotors. Each of the rotors is rotated simultaneously in opposite directions relative to the other utilizing the aforementioned arrangement of a single drive shaft with left and right hand helical ball splines between the respective rotors and the drive shaft.

These and other objects, features and advantages of the present invention will become more apparent from the following description when taken in connection with the accompanying drawings, which show, for purposes of illustration only, two embodiments in accordance with the present invention.

BEST MODE FOR CARRYING OUT THE INVENTION

Figure 1:
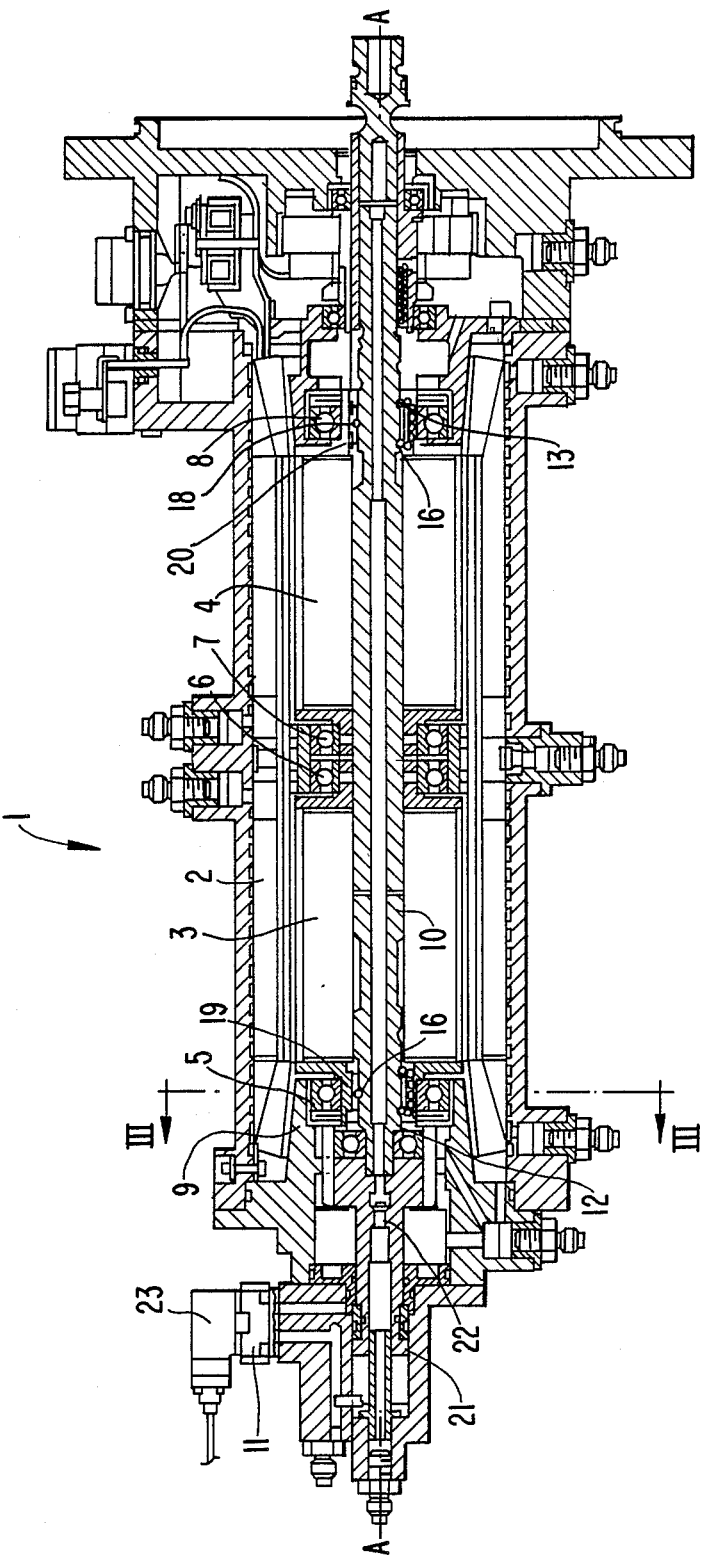
FIG. 1 is a side view, partly in cross-section, of an alternating current generator according to a first embodiment of the invention.
Figure 2:
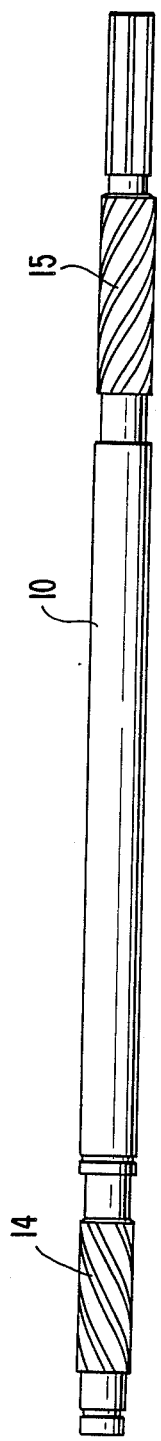
FIG. 2 is an enlarged view of the drive shaft for rotating the two magnet rotors of the generator of FIG. 1.
Figure 3:
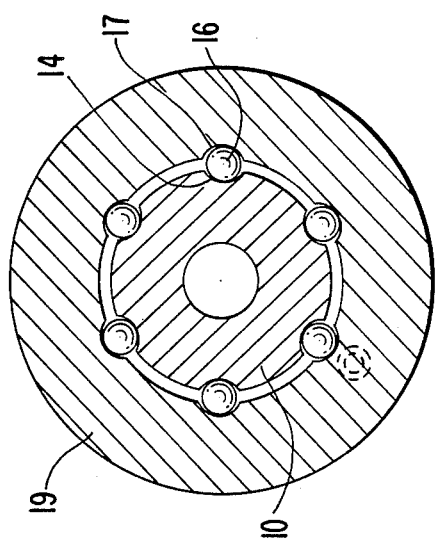
FIG. 3 is a cross-sectional view taken along the line III—III in FIG. 1 in illustrating the helical ball spline between the drive shaft and one of the magnet rotors.

Referring now to the drawings, an alternating current, permanent magnet generator 1 according to a first embodiment of the invention is illustrated in FIGS. 1–3. The generator 1 comprises a stator 2 having an output winding for producing an output voltage, and a first magnet rotor 3 and a second magnet rotor 4 rotatably supported within the stator 2 by means of bearings 5, 6, 7 and 8 carried by a frame 9 of the generator. The rotors 3 and 4 are adapted to be rotated at high speed in the same direction within the stator 2 about a common axis of rotation A—A for generating an alternating current. In order to control the voltage as the generator load varies, the rotors 3 and 4 are angularly adjusted relative to one another about the axis of rotation A—A.

According to the invention, to minimize the amount of power required for such an angular adjustment of the rotors relative to one another, the two rotors 3 and 4 are rotatably driven by a common drive shaft 10 which, in turn, is rotatably driven by a suitable motor through appropriate gearing. The rotors 3 and 4 are rotatably driven by the shaft 10 by way of helical ball splines 12 and 13. The ball spline 12 is a left hand, helical ball spline and the ball spline 13 is a right hand, helical ball spline. The helical ball splines comprise oppositely directed grooves 14 and 15 in the respective ends of the drive shaft as shown in FIG. 2. Balls 16 of the ball splines are positioned in the grooves 14 and 15 and also in respective helical grooves 17 and 18 formed in the cooperating annular sleeves 19 and 20 of the rotors 3 and 4, respectively. The helical ball splines serve to transmit the rotation of the drive shaft 10 to the rotors 3 and 4 during operation of the generator and, in addition, with axial movement of the drive shaft 10 along the axis A—A, an angular adjustment of the rotors 3 and 4 relative to each other can be affected, either during a high speed rotation of the rotors or while the rotors are stationary.

Because the grooves 14 and 15 in the respective ends of the drive shaft 10 are oppositely directed, an axial motion of the drive shaft 10 along the axis A—A will cause the rotors 3 and 4 to simultaneously rotate in opposite directions relative to one another a like amount. That is, each is rotated a magnitude of one half the necessary relative rotation between the rotors as a result of an axial motion of the drive shaft 10.

Figure 4:
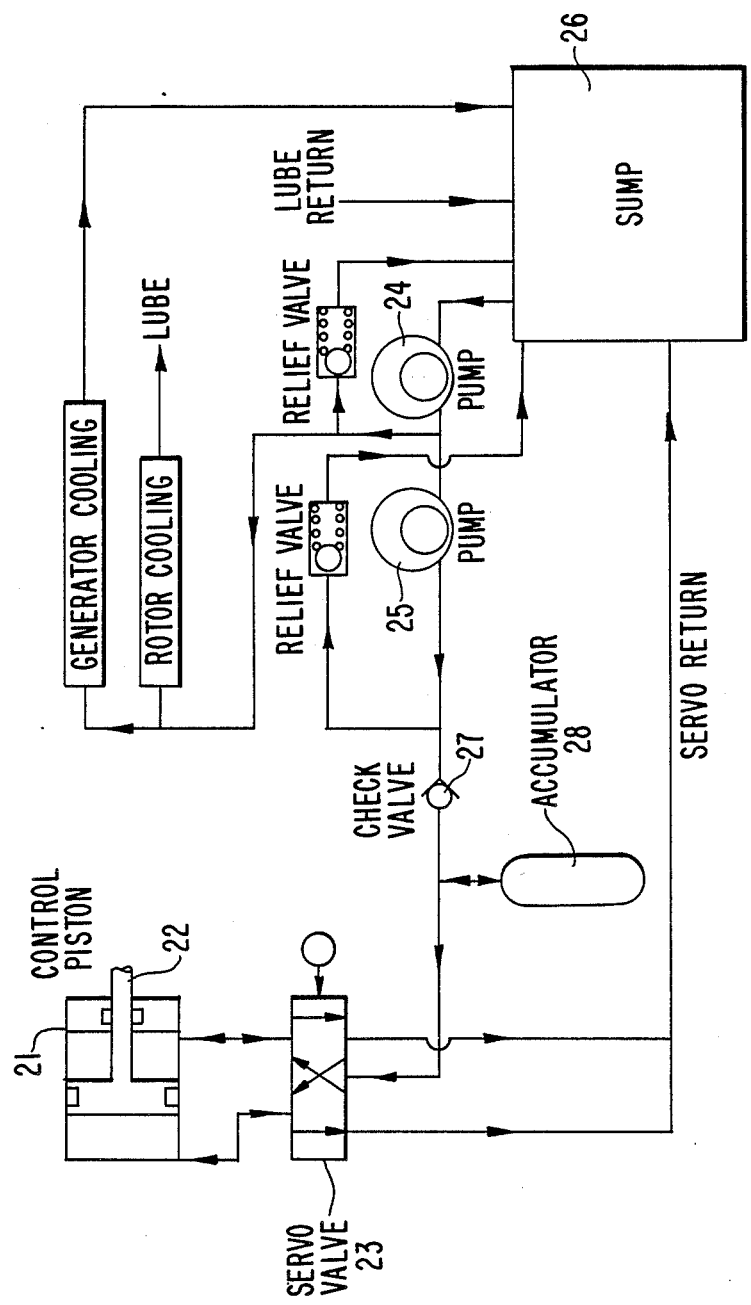
FIG. 4 is a hydraulic schematic diagram for the dual permanent magnet generator of FIG. 1.

The axial motion of the drive shaft 10 is accomplished hydraulically in the embodiment of FIGS. 1-3 using a piston cylinder unit 21. The piston of the piston cylinder unit 21 is connected rigidly to the end of the drive shaft 10 by a rod coupling 22 shown generally in FIG. 1. A servovalve 23 controls a position of the piston of the piston cylinder unit, which is turn controls the axial position of the drive shaft and the relative angular position of the rotors. A schematic diagram of the hydraulic system for actuating the piston cylinder unit is illustrated in FIG. 4 wherein it is seen that pumps 24 and 25 deliver pressurized hydraulic fluid from a sump 26 to the servovalve 23 by way of a check valve 27. An accumulator 28 is also provided in the fluid line to the servovalve. The hydraulic system can be actuated to control the output voltage of the generator by adjusting the relative positions of the rotors 3 and 4 about the axis A—A during high speed operation of the generator.

Figure 5:
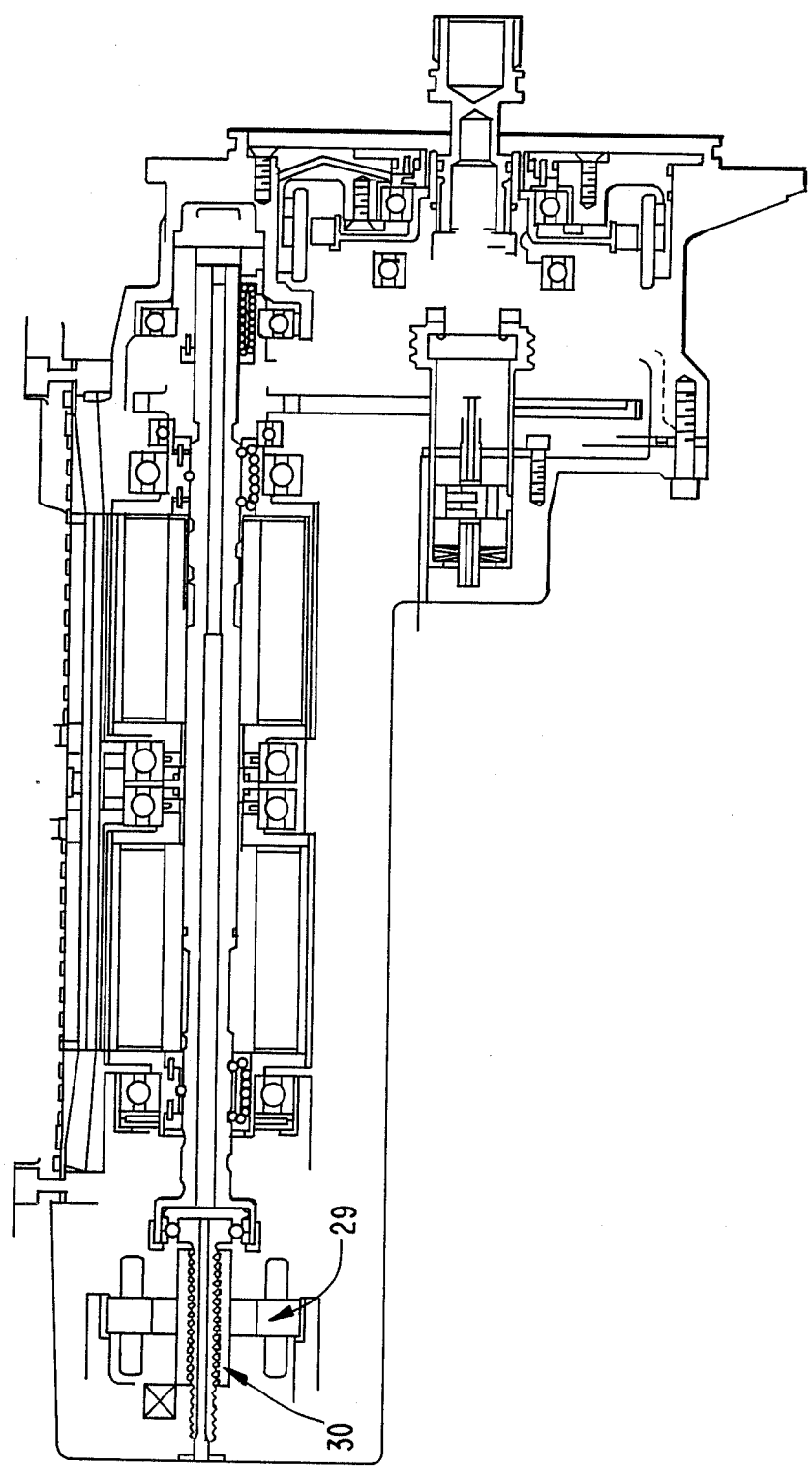
FIG. 5 is a side view of a second embodiment of an alternating current permanent magnet generator according to the invention.

In a second embodiment of the invention as illustrated in FIG. 5, an electric motor 29 and a ball screw 30 are used to axially move the drive shaft 10 for adjusting the angular position of the rotors 3 and 4 relative to one another about the axis A—A. In particular, the motor 29 rotates the ball screw, which actuates the drive shaft back and forth along the axis A—A.

It has been found that the actuator of the invention for angularly adjusting the rotors relative to one another offers relatively little friction during adjustment of the angular position of the rotors because of the use of the two, oppositely directed helical ball splines which transmit the axial motion of the drive shaft to angularly adjust the rotors relative to each other such that each rotor is rotated one half of the necessary angular adjustment. This minimizes the power required for adjusting the rotors during operation of the generator thereby improving the efficiency of the generator.

While I have shown and described only two embodiments in accordance with the present invention, it is understood that the same is not limited thereto, but is susceptible to numerous changes and modifications as known to those skilled in the art. For example, it is in envisioned that the actuator of the invention could be employed to accomplish angular adjustment of rotors relative to each other in apparatus other than a generator. Also, axial motion of the drive shaft can be accomplished by means other than the hydraulic system and electric motor and ball screw disclosed herein. Therefore, I do not wish to be limited to the details shown and described herein, but intend to cover all such changes and modifications as are encompassed by the scope of the appended claims.

I claim:

1. An alternating current generator comprising stator means having an output winding for producing an output voltage, rotor means within said stator means, said rotor means including first and second magnetic rotors rotatable about a common axis, and means for angularly adjusting said first and second rotors relative to one another about said common axis, said means for angularly adjusting including means for rotating each of said first and second rotors in opposite directions relative to the other for affecting a relative angular adjustment of the rotors, wherein said means for rotating simultaneously rotates each of said rotors a like amount in opposite directions during a relative angular adjustment.

2. An alternating current generator according to claim 1, wherein said means for rotating comprises a drive shaft extending along said common axis for rotatably driving said first and second rotors about said common axis.

3. An alternating current generator, comprising stator means having an output winding for producing an output voltage, rotor means within said stator means, said rotor means including first and second magnetic rotors rotatable about a common axis, and means for angularly adjusting said first and second rotors relative to one another about said common axis, said means for angularly adjusting including means for rotating each of said first and second rotors in opposite directions relative to the other for affecting a relative angular adjustment of the rotors, wherein said means for rotating comprises a drive shaft extending along said common axis for rotatably driving said first and second rotors about the common axis and wherein said means for rotating further comprises means for rotatably supporting said rotors at essentially fixed locations along said common axis and left and right hand helical ball splines located between said drive shaft and said first and second rotors, respectively, for affecting said rotation of the first and second rotors in opposite directions with axial movement of said drive shaft along said common axis relative to said rotors.

4. An alternating current generator according to claim 3, further comprising means for axially moving said drive shaft along said common axis relative to said rotors for affecting an annular adjustment of the rotors.

5. An alternating current generator according to claim 4, wherein said means for axially moving comprising a hydraulic drive means for axially moving said drive shaft.

6. An alternating current generator according to claim 4, wherein said means for axially moving comprises an electric motor for axially moving said drive shaft.

7. In an actuator for angularly adjusting first and second rotors which are rotable about a common axis, relative to each other about the common axis, the improvement comprising means for simultaneously rotating each of said first and second rotors a like amount in opposite directions relative to the other for affecting a relative angular adjustment of the rotors.

8. In a method of angularly adjusting the relative positions of first and second rotors of a permanent magnetic generator about a common axis of rotation of said rotors, the improvement comprising simultaneously rotating each of said rotors a like amount in opposite directions relative to the other to affect a relative angular adjustment of the rotors.

9. The method according to claim 8, further comprising the step of rotatably driving both of said rotors by a drive shaft during said step of adjusting the relative angular position of the rotors.

10. In a method of angularly adjusting the relative positions of first and second rotors of a permanent magnetic generator about a common axis of rotation of said rotors, the improvement comprising rotating each of said rotors in opposite directions relative to the other to affect a relative angular adjustment of the rotors, wherein said rotation of each rotor in an opposite direction relative to the other is accomplished by axially moving said drive shaft relative to said rotors, left and right hand helical splines being provided between said drive shaft and said first and second rotors, respectively, for translating the axial movement of the shaft into said oppositely directed rotations of said rotors.

* * * * *